(12) United States Patent
Katayama et al.

(10) Patent No.: US 6,324,471 B1
(45) Date of Patent: Nov. 27, 2001

(54) MAP INFORMATION DISPLAY SYSTEM FOR MOVABLE BODIES

(75) Inventors: Mutsumi Katayama; Hiroyuki Morita, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/559,577

(22) Filed: Apr. 28, 2000

(30) Foreign Application Priority Data

Apr. 30, 1999 (JP) ................................................. 11-123580

(51) Int. Cl.[7] ...................................................... G05D 1/00
(52) U.S. Cl. ............................ 701/209; 701/212; 701/25; 73/178 R; 340/988; 340/990; 340/995; 342/357.13
(58) Field of Search ................................ 701/23, 25, 208, 701/209, 212, 213; 73/178 R; 340/988, 990, 995; 342/357.06, 357.08, 357.12, 357.13

(56) References Cited

U.S. PATENT DOCUMENTS 6,064,941 * 5/2000 Nimura et al. ........................ 701/210

FOREIGN PATENT DOCUMENTS

A7073396    3/1995  (JP) .

* cited by examiner

Primary Examiner—Yonel Beaulieu
(74) Attorney, Agent, or Firm—Birch, Stewart, Kolasch and Birch, LLP

(57) ABSTRACT

To provide a map-information display system for a movable body capable of retrieving proper map information according to a route having been passed through by the movable body and/or a route to be traveled by the movable body and displaying the information. A limited-area map-information generation device for retrieving map information of only a limited area based on coordinate information of positions on a route on a map showing the positions on the route passed through and to be traveled by a movable body includes a route generation device for generating a route for the movable body based on the coordinate information of the positions on the route and the road information, and a retrieval device for converting banner-like shaped-area map information.

11 Claims, 6 Drawing Sheets

MAP INFORMATION DISPLAY SYSTEM FOR MOVABLE BODIES

BACKGROUND OF THE INVENTION

1. Field of the Invention

The present invention relates to a map-information display system used by a movable body for retrieving map information from a recording medium and displaying the retrieved information.

2. Description of Related Art

A map-information display apparatus for retrieving map information of a certain area and displaying the information is disclosed in Japanese Patent Laid-open No. Hei 7-73396. The map-information display apparatus retrieves map information of an area required by the operator and displays the information.

When retrieving, for example, map information regarding a route which is specified by the operator and which includes a detour; the apparatus retrieves map information in the vicinity of the detour. However, the apparatus also retrieves unnecessary map information encircled by the detour. This inevitably causes a large amount of retrieved map information. In addition, if the amount of retrieved map information exceeds the capacity of a storage medium employed in the map-information display apparatus, an inability to accommodate the retrieved map information in the storage medium can occur.

SUMMARY OF THE INVENTION

It is thus an object of the present invention addressing the problems described above to provide a map-information display system used by a movable body for retrieving proper map information according to a route having been passed through by the movable body and a route to be traveled by the movable body and for displaying the information.

The map-information display system provided by the present invention for use by a movable body includes a coordinate-information generation means for generating coordinate information of positions on a route having been passed through and a route to be traveled by the movable body on a map; a limited-area map-information generation means for generating map information of a limited area by retrieving the map information of only the limited area based on the coordinate information of positions on the routes from map information which includes road information and is stored in a storage medium; and a display means for storing and displaying the map information of the limited area, wherein the limited-area map-information generation means comprises: a route generation means for generating a route for the movable body based on the coordinate information of positions on the route and the road information; and a retrieval means for converting banner-like shaped-area map information, that is, map information of an area with a shape resembling a banner stretched along a route to be traveled by the movable body, into the map information of a limited area.

In the present invention, the map information of a banner-like-shaped area stretched along a route to be traveled by the movable body is stored as map information of a limited area so that it is possible to retrieve proper map information according to a route having been passed through by the movable body and a route to be traveled by the movable body and to display the information.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the all from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
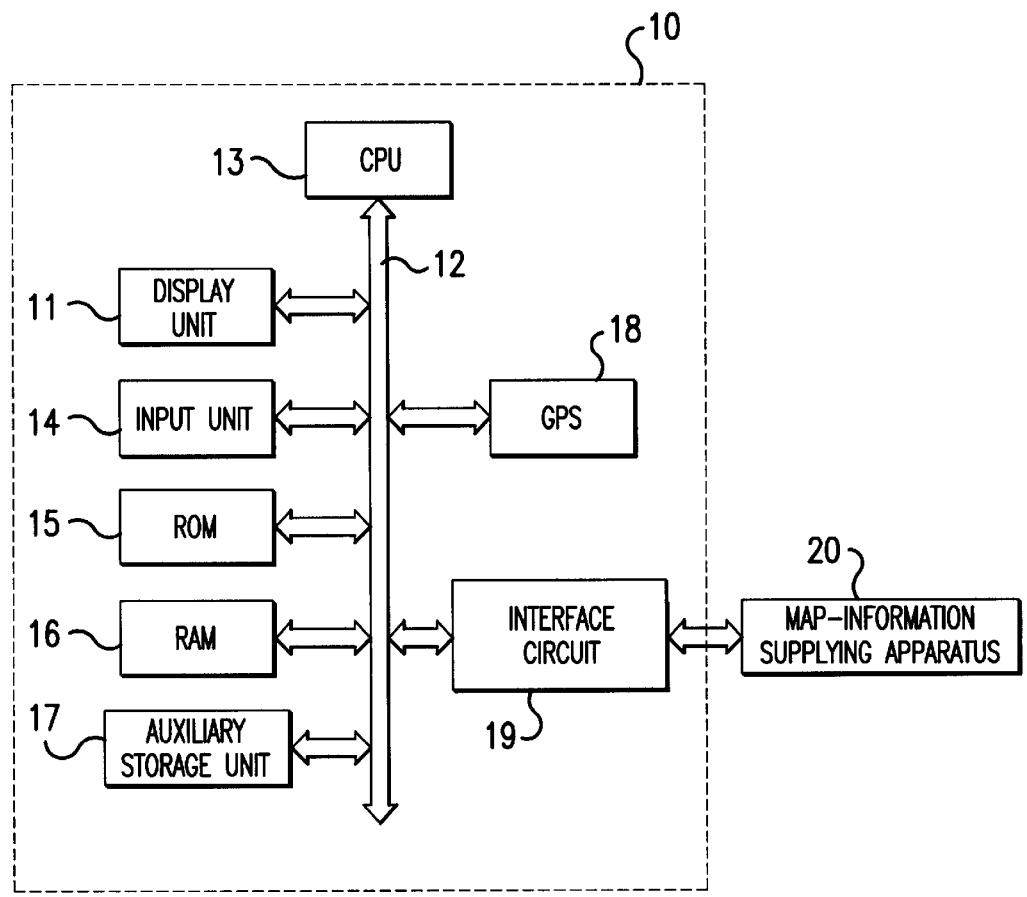
FIG. 1 is a block diagram showing a map-information display system provided by the present invention for use by a movable body.

The present invention will now be described with reference to the accompanying drawings. FIG. 1 is a diagram showing a map-information display system for use by a movable body in a first embodiment of the present invention.

As shown in FIG. 1, the map-information display system for use by a movable body comprises a map-information display apparatus for a movable-body 10 such as an onboard navigation system apparatus and a map-information supplying apparatus 20 such as a CD-ROM drive or a DVD drive.

In the map-information display apparatus for a movable-body 10, a display unit 11 comprises a display means such as a CRT or a liquid-crystal panel, a graphic memory and a graphic controller which are not shown in the drawings. The display unit 11 is connected to an input/output bus 12. The input/output bus 12 is used for transmitting data signals to and from a central processing unit 13 and an address signal from the central processing unit 13 which is abbreviated hereafter as a CPU. The display unit 11 displays map information received from the input/output bus 12. The input/output bus 12 is also connected to an input unit 14 which is used by the operator for entering a variety of commands to the CPU 13. The input unit 14 is a keyboard including a select key for selecting an item displayed on the display unit 11 and a cursor key for specifying a position on a map displayed on the display unit 11. It should be noted that the select key and the cursor key are not shown in the drawings. In addition, also connected to the input/output bus 12 is a ROM (Read-Only Memory) 15 and a RAM (Random-Access Memory) 16. The ROM 15 is used for storing a program for generating map information of a limited area as will be described later. Programs to be executed in dependence on a command are entered via the input unit 14. On the other hand, the RAM 16 is used for storing map information of a limited area and the values of variables of a program are executed by the CPU 13. The RAM 16 is implemented typically by a non-volatile memory. A non-volatile memory is a memory which retains data stored therein even if power supplied thereto is cut off. In addition, an auxiliary storage)e unit 17 can also be connected to the input/output bus 12 as shown in FIG. 1. The auxiliary storage unit 17 comprises an IC card which is implemented typically by a non-volatile memory and an interface circuit for the IC card. It should be noted that the IC card and the interface circuit are not shown in the drawings. The auxiliary storage unit 17 is used for storing map information of a limited area of such a large amount that the information can not be stored in the RAM 16.

In addition, the input/output bus 12 is also connected to a GPS (Global Positioning System) unit 18. The GPS unit 18 is used for detecting the absolute position of the movable body from information on a latitude and a longitude. The detected positional data is supplied to the input/output bus 12.

The map-information supplying unit 20 is a drive of a non-volatile storage medium such as a CD-ROM. A typical map-information supplying unit 20 is a CD-ROM drive for reading out map information stored in a CD-ROM mounted thereon. To put it in detail, map information stored in the CD-ROM is read out in response to a command issued by the CPU 13 and supplied to the input/output bus 12 by way of an interface circuit 19.

According to the first embodiment, the map-information display system for use by a movable body comprises the map-information display apparatus for a movable-body 10 and the map-information supplying apparatus 20. A coordinate-information generation means is implemented by the input unit 14 whereas a means for generating map information of a limited area, a route generation means and a retrieval means are implemented jointly by the input/output bus 12, the CPU 13 and the ROM 15. A display means comprises the display unit 11, the RAM 16 and the auxiliary storage unit 17. A means for detecting coordinates of the present position is implemented by the GPS unit 18.

In the following description, it is assumed that, when the map-information display system for use by a movable body is activated, activation processing such as initialization of variables used in the CPU13 is completed and the system is running a steady-state operation.

Figure 2:
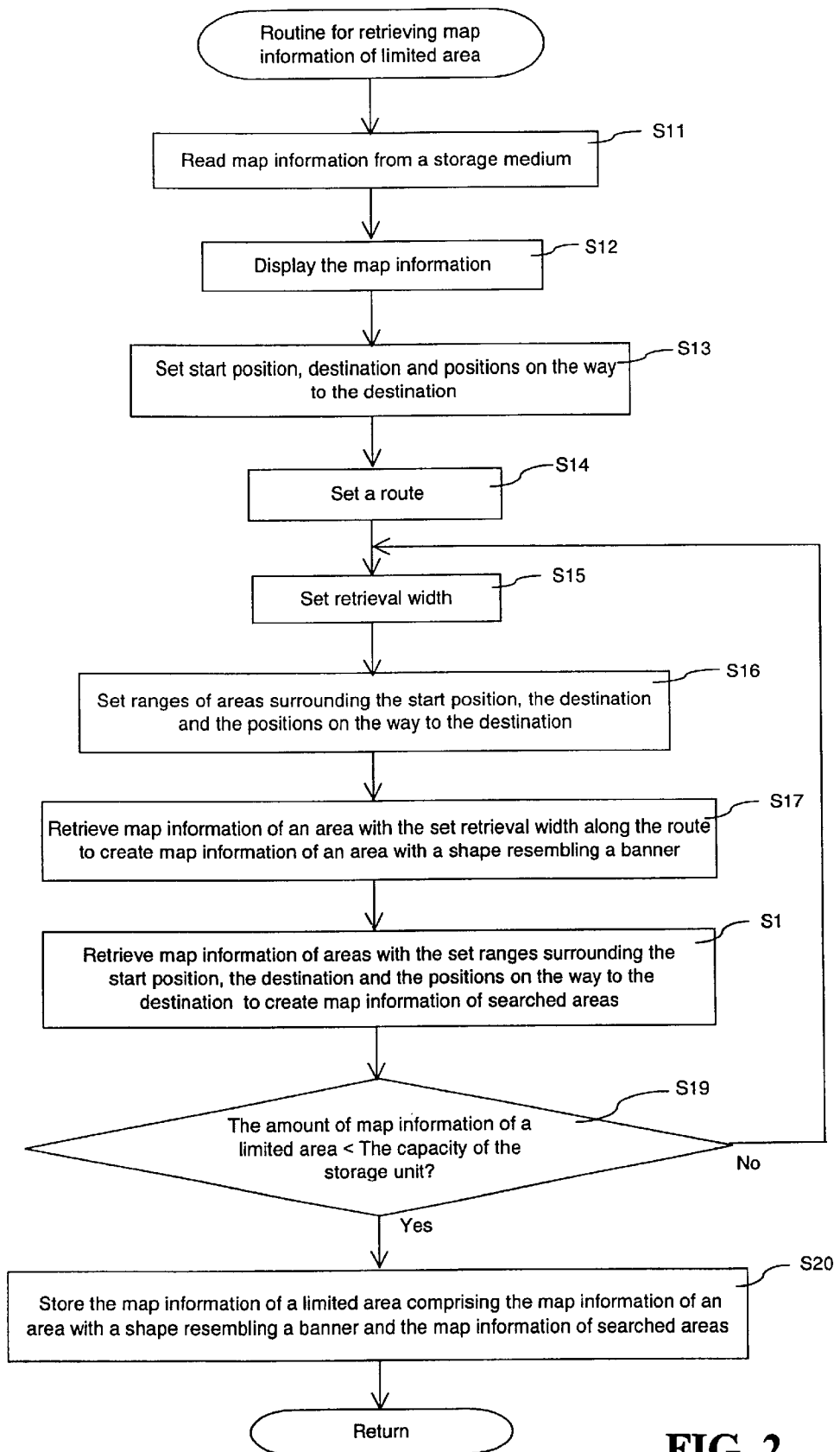
FIG. 2 is a flowchart representing a subroutine for retrieving map information of a limited area.

FIG. 2 shows a subroutine for retrieving and generating map information of a limited area. As shown in FIG. 2, the subroutine begins with a step S11 at which map information stored in a CD-ROM is read out from the CD-ROM drive 20 cited above in accordance with a key-in entered via the input unit 14 by the operator. Then, at a step S12, the map information read out from the CD-ROM drive 20 is displayed on the display unit 11.

Subsequently, at a step S13, a start position, a destination and a variety of positions on the way to the destination are set. Each of these positions leading to the destination is set by inputting information on coordinates, such as the coordinates of the latitude and the longitude of the desired position, by operating keys on the input unit 14. To be more specific, information on coordinates is entered typically as follows. A pointer having a cross-shaped mark or an arrow-shaped mark for pointing a position on a map is displayed, being superposed on the map appearing on the display unit 11. The pointer can be moved by operating the cursor key to specify any position on the map. It should be noted that, if a plurality of places with known geographical names exist in the vicinity of a position to be specified, the geographical names of the places are each displayed on the display unit 11 to be selected by operating the select key. By selecting the name of a place, the information on the coordinates for the selected name of the place is obtained. In addition, in order to make the input operation simple, the map-information display apparatus for a movable-body 10 may be provided with a function to enlarge or shrink a map displayed oil the display unit 11 by operating another key. In the following description, the start position and the destination are denoted by notations $P_1$ and $P_n$, respectively whereas positions on the way to the destination are denoted by notations $P_2$ to $P_{n-1}$. A section between two consecutive positions such as $P_1$ and $P_2$ or $P_{i-1}$ to $P_i$ is referred to as an interposition section.

Then, at a step S14, information on coordinates of $P_1$ to $P_n$ and road information contained in the map information are searched for a route that shall be traveled by the movable body, and the route is then confirmed on a map appearing on the display unit 11. It should be noted that as a technique to search for a route, it is possible to adopt a commonly known method such as those disclosed in Japanese Patent Laid-open Nos. Hei 7-55481 and Hei 7-91971. If there are a plurality of selectable routes in an interposition section found during the search for a route, one of the routes can be selected as follows. First of all, the selectable routes are all displayed on the map. Then, one of the displayed routes is selected by operating the cursor key to move the pointer to a desired route displayed on the display unit 11 as is the case with the technique to select a position as described above.

Then, at a step S15, for each interposition section, a retrieval width $\Delta w_i$ of the interposition section where $i=1,---,(n-1)$ is set. A retrieval width is a number expressed typically in terms of kilometers, being entered by the operator, for example, by operating the ten keys which are included in the input unit 14.

Subsequently, at a step S16, the range of an area surrounding each of the positions $P_1$ to $P_n$ described above is set. The range of an area surrounding a predetermined position $P_i$ is set for retrieving information on a map of a broader area including the position $P_i$. The information on a map of such a broader area is necessary when the operator wants to search an area centered at the position $P_i$ or to move within the area. The range of an area surrounding each of the positions $P_1$ to $P_n$ has a typical circular shape centering at the position. In this case, the radius $\Delta R_i$ of the circular range centering at the position $P_i$ where $i=1,---,n$, is entered by the operator by operating the ten keys provided on the input unit 14 as a number expressed typically in terms of kilometers. In addition, the surrounding area may also have a rectangular shape instead of having a circular shape. In this case, the length or the horizontal dimension and the width or the vertical dimension of the area are each entered as a number via the input unit 14. Then, the map information in the vicinity of each of the points $P_1$ to $P_n$ is displayed on the display unit 11, and the pointer displayed on the display unit 11 is moved over the map by operating the cursor key to set a desired range having a rectangular or circular shape on the display unit 11. The range of a surrounding area can also be set in this way.

Subsequently, at a step S17, map information along the route with a retrieval width set at the step S15 is retrieved. The retrieved map information with a fixed retrieval width $\Delta w_i$ along an interposition section between two consecutive positions $P_i$ and $P_{i+1}$ where $i=1,---,(n-1)$ has a shape resembling a banner. In the following description, pieces of map information $Aw_1$ to $Aw_{n-1}$ retrieved along an interposition section on a route is referred to as banner-like-shaped-area map information. Then, at a step S18, the map of an area surrounding each of the points $P_1$ to $P_n$ retrieved to form a circle with a radius $\Delta R_i$ where i=1, - - -, (n−1). In the following description, pieces of information on maps $A_1$ to $A_n$ of areas surrounding the points $P_1$ to $P_n$ are referred to as searched-area map information. The banner-like-shaped-area map information with the searched-area map information added thereto are referred to particularly as limited-area map information amongst other map information.

Subsequently, at a step S19, the map-information display apparatus for a movable-body 10 forms a judgment as to whether or not the amount of the limited-area map information to be stored is smaller than the predetermined storage capacity of the auxiliary storage unit 17 or another storage unit such as the RAM 16. If the amount of the limited-area map information to be stored is found greater than the predetermined storage capacity of the auxiliary storage unit 17 or the RAM 16, the flow of the subroutine goes back to the step S15 in order to set the retrieval width $\Delta w_i$ and the radius $\Delta R_i$ at smaller values enough to be stored therein. If the amount of the limited-area map information to be stored is found equal to or smaller than the storage capacity of the auxiliary storage unit 17 or the RAM 16, on the other hand, the flow of the subroutine goes on to a step S20 at which the limited-area map information is retrieved from map information stored in the CD-ROM and stored into the auxiliary storage unit 17 or the RAM 16 before terminating this subroutine. The control is then returned to a program serving as a main routine for controlling the map-information display apparatus for a movable-body 10.

Figure 3:
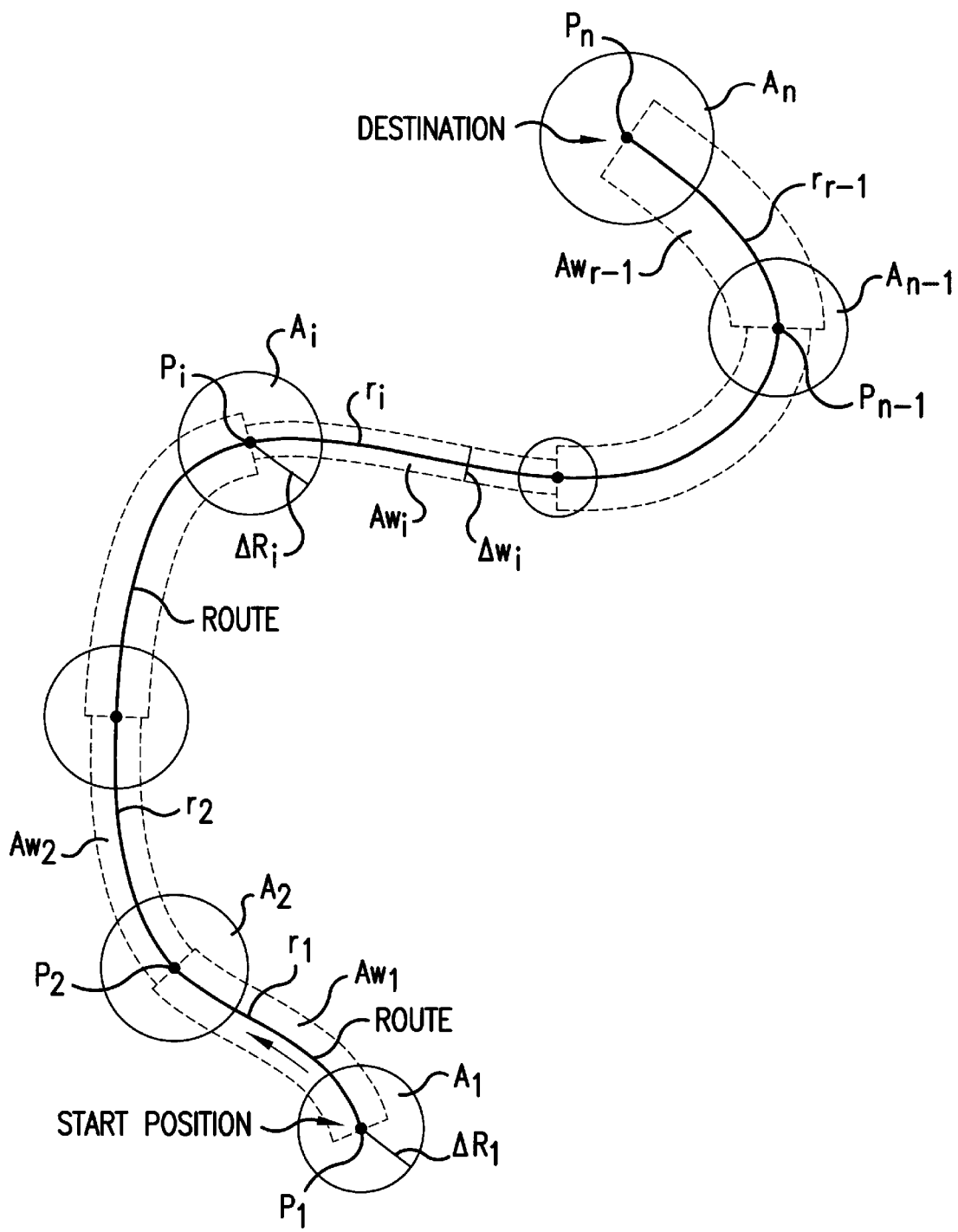
FIG. 3 is a diagram showing examples of the banner-like-shaped-area map information, the searched-area map information and the limited-area map information.

FIG. 3 is a diagram showing examples of the banner-like-shaped-area map information, the searched-area map information and the limited-area map information.

As described above, a start position, a destination and a variety of positions on the way to the destination set at the step S13 are denoted by notations $P_1$, $P_n$ and $P_2$ to $P_{n-1}$, respectively. The route confirmed at the step S14 is represented by a thick line and routes along interposition sections are denoted by notations $r_1$ to $r_{n-1}$. The retrieval widths set at the step S15 are denoted by symbols $\Delta w_1$ to $\Delta A_{n-1}$ and the radii of surrounding areas set at the step S16 are denoted by symbols $\Delta R_1$ and $\Delta R_n$.

The shapes of areas $Aw_1$ to $Aw_{n-1}$, the pieces of information along the route of which are retrieved along the route at the step S17, each has a shape resembling a banner shown by dashed lines in FIG. 3. On the other hand, the pieces of map information retrieved at the step S18 are searched-area map information of areas $A_1$ to $A_n$ which include the positions $P_1$ to $P_n$, respectively and each have a circular shape.

Since the map-information display apparatus for a movable-body 10 has a configuration for retrieving and storing only limited-area map information comprising banner-like-shaped-area map information and searched-area map information as shown in FIG. 3, the amount of the map information can be reduced.

Figure 4:
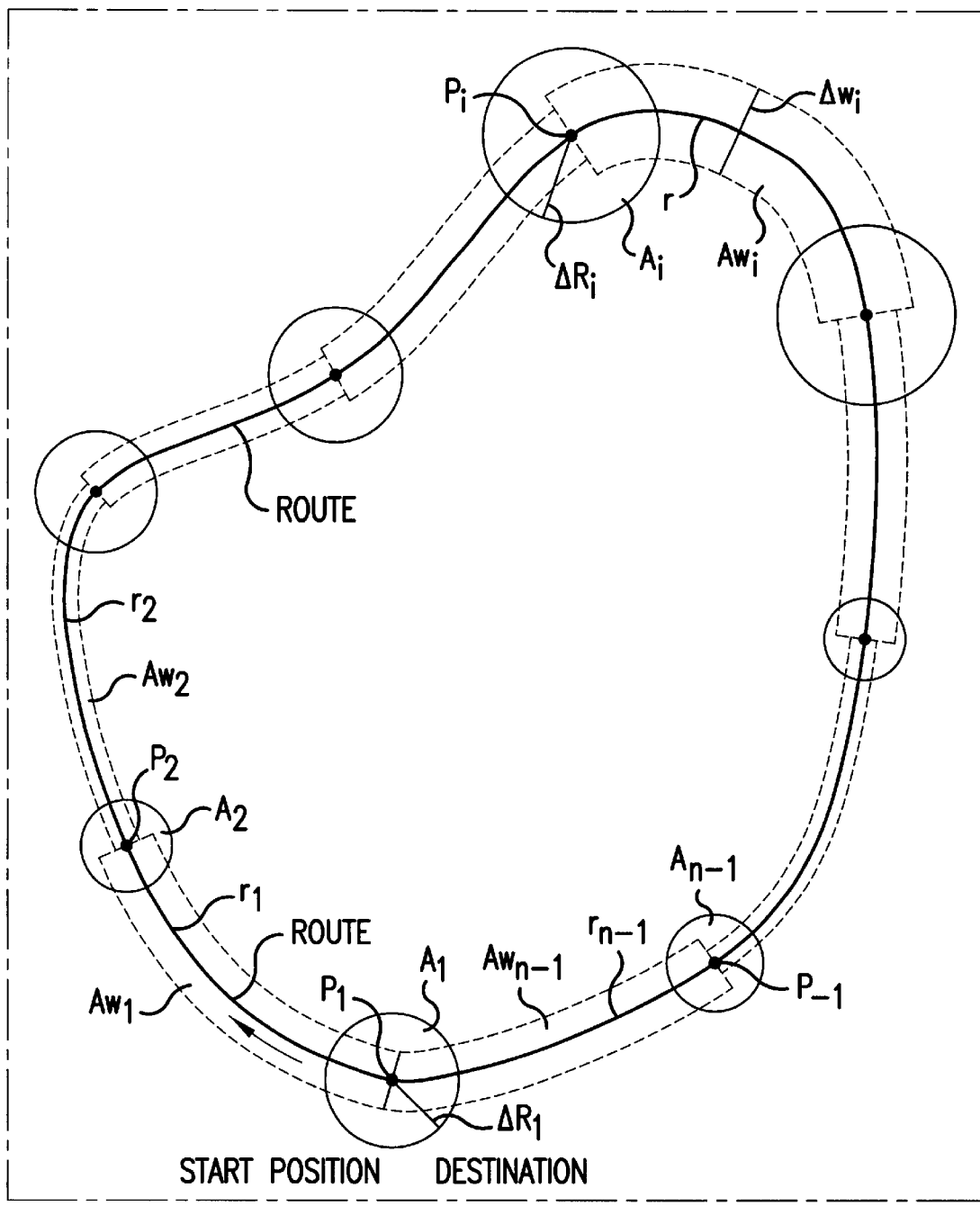
FIG. 4 is a diagram example of the banner-like-shaped-area map information, the searched-area map information and the limited-area map information in the case where a detour is taken on a route.

FIG. 4 is a diagram showing examples of the banner-like-shaped-area map information, the searched-area map information and the limited-area map information in the case where a detour is taken on a route. It should be noted that elements identical with those shown in FIG. 3 are denoted by the same notations and/or the same symbols as the latter. In this case, since the destination is the same as the start position, the route includes only the positions $P_1$ to $P_{n-1}$ and the searched-area map information is information only on areas $A_1$ to $A_{n-1}$ having radii $\Delta R_1$ to $\Delta R_{n-1}$, respectively.

When map information for an area with a rectangular shape like the one shown in FIG. 4 is retrieved by using the conventional technology, it is necessary to provide a storage means such as a RAM with a capacity large enough for storing the map information for the entire area. In accordance with the map-information display system provided by the present invention for use by a movable body, on the other hand, only pieces of map information for the areas each having a shape resembling a banner and the circular areas and pieces of circular-area map shown in FIG. 4, that is, only limited-area map information comprising pieces of banner-like-shaped-area map information or a searched area map information needs to be retrieved. Accordingly, a storage means such as a RAM with a capacity large enough merely for storing the limited-area map information is required.

Figure 5A:
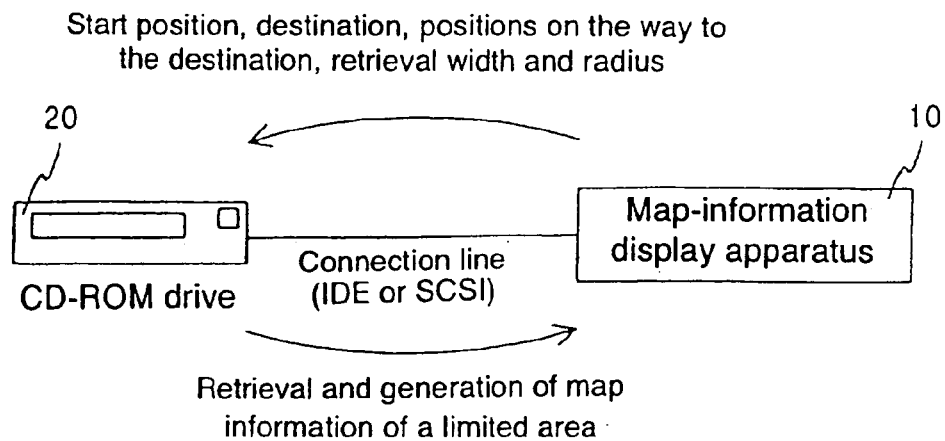
FIGS. 5A and 5B are schematic diagrams showing an embodiment of the present invention.
Figure 5B:
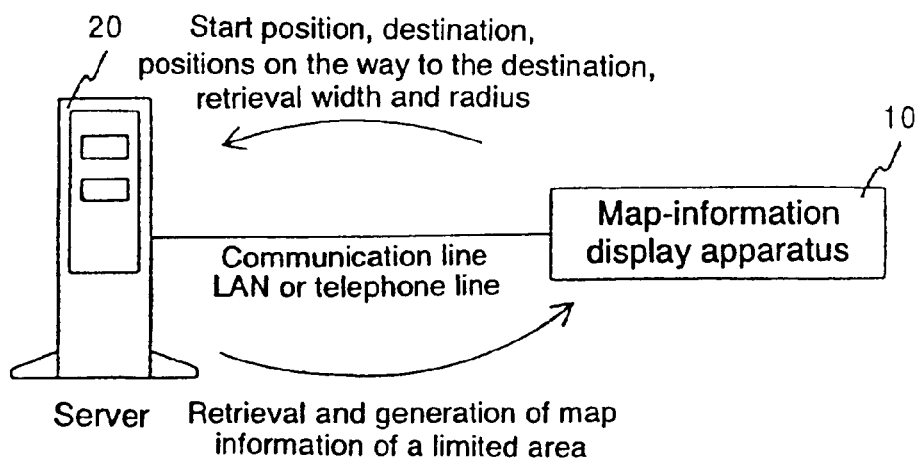

FIGS. 5A and 5B are diagrams showing an embodiment of the present invention.

To be more specific, FIG. 5A is a schematic diagram showing the map-information display system implemented by the first embodiment of the present invention for use by a movable body as described above. In this case, the map-information supplying apparatus 20 is an external auxiliary storage apparatus such as a CD-ROM drive or a DVD drive. On the other hand, the map-information display apparatus for a movable-body 10 is typically an onboard navigation system apparatus which includes a predetermined-interface circuit and a connector for connecting the map-information display apparatus for a movable-body 10 to the external auxiliary storage apparatus, such as the map-information supplying apparatus 20. An example of the predetermined-interface circuit is an interface circuit conforming to IDE or SCSI specifications. It should be noted that the predetermined-interface circuit and the connector themselves are not shown in FIGS. 5A and 5B. Firstly, the operator sets a recording medium containing map information of a desired area in the external auxiliary storage apparatus 20. In the case of a CD-ROM drive serving as the external auxiliary storage apparatus 20, for example, a CD-ROM not shown in the figure is mounted therein. Then, by operating the keyboard provided on the map-information display apparatus 10, or the onboard navigation system apparatus 10, in accordance with the procedure explained earlier by referring to the flowchart shown in FIG. 2, the operator is capable of creating map information of a limited area and storing the information in a storage means such as a non-volatile RAM provided in the map-information display apparatus 10, or the onboard navigation system apparatus 10. When the operator is touring, for example, on a motorcycle, it is necessary to mount only the map-information display apparatus 10, or the onboard navigation system apparatus 10, in which the map information of the limited area has been stored.

On the other hand, FIG. 5B is a schematic diagram showing a map-information display system implemented by a second embodiment of the present invention for use by a movable body. In this system, the map-information supplying apparatus 20 is implemented by a server serving as a source of map information such as a server connected to the Internet and used for providing map information. An onboard navigation system apparatus serving as the map-information display apparatus includes a communication interface circuit for communicating with the server 20 typically through a communication line such as a local area network abbreviated hereafter to a LAN or a telephone line. It should be noted that the communication interface circuit itself is not shown in FIG. 5B. After map information of a limited area is created in the server 20 by executing the procedure shown in FIG. 2 explained earlier, the map information is downloaded from the server 20 to the map-information display apparatus 10, or the onboard navigation system apparatus 10 and stored in a storage means such as a non-volatile RAM provided in the map-information display apparatus 10, or the onboard navigation system apparatus 10. In travel like the one described above, the operator needs to take along only the map-information display apparatus 10, or the onboard navigation system apparatus 10 in which the map information of the limited area has been stored. In the case of this second embodiment, the coordinate-information generation means, the limited-area map-information generation means and the display means are all incorporated in the map-information display apparatus 10, or the onboard navigation system apparatus 10 which is used as the map-information display apparatus.

Figure 6A:
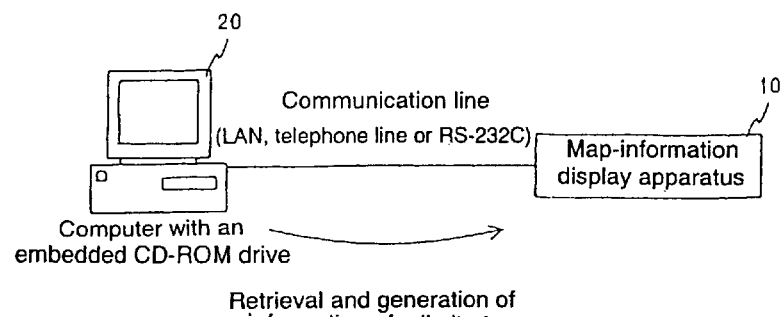
FIGS. 6A–6C are schematic diagrams showing another embodiment of the present invention.
Figure 6B:
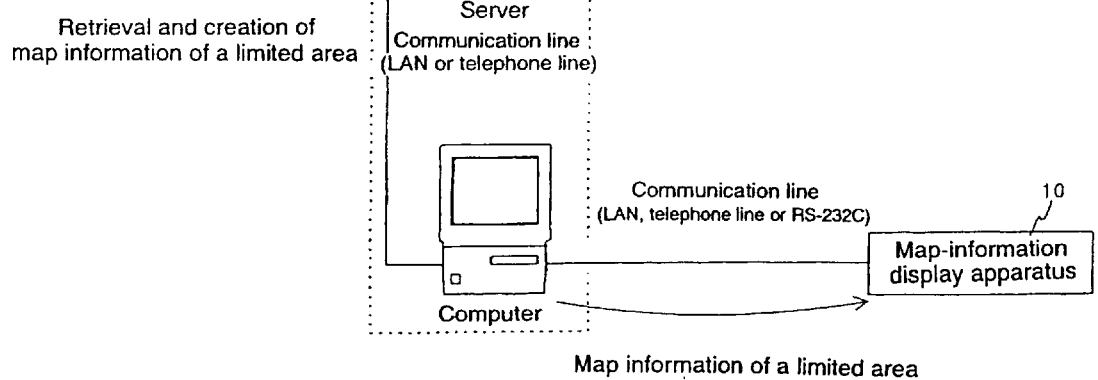
Figure 6C:
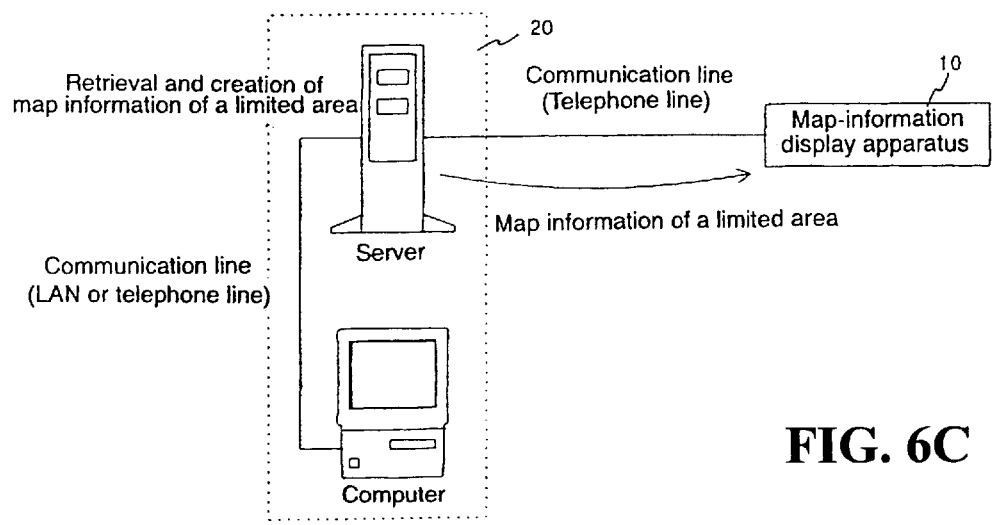

FIGS. 6A–6C are diagrams showing another embodiments of the present invention.

To be more specific, FIG. 6A is a schematic diagram showing a map-information display system implemented by a third embodiment of the present invention for use by a movable body. In the case of the map-information display system implemented by the third embodiment of the present invention for use by a, movable body, map information of a limited area is generated in an apparatus other than the map-information display apparatus 10, or the onboard navigation system apparatus 10.

An example of the apparatus for generating map information of a limited area is a computer including an embedded CD-ROM drive. First of all, the operator mounts a CD-ROM storing map infoimation of a desired area on the CD-ROM drive to display the map information on a display unit connected to the computer. It should be noted that the CD-ROM itself is not shown in FIG. 6A. Then, the operator creates map information of a limited area in the computer in accordance with the procedure explained earlier by referring to the flowchart shown in FIG. 2 by operating a keyboard and a mouse of the computer. Finally, the computer is connected to the map-information display apparatus 10, or the onboard navigation system apparatus 10 serving as the map-information display apparatus having a communication function through a predetermined communication means such as a LAN, a telephone line or a serial-communication connection line in order to store the limited-area map information generated in the computer into a storage unit such as a RAM or the like provided in the map-information display apparatus 10, or the onboard navigation system apparatus 10. When the operator is traveling, it is necessary to take along only the map-information display apparatus 10, or the onboard navigation system apparatus 10 in which the map information of the limited area has been stored as described above. In addition, the limited-area map information generated in the computer can also be stored in a server such as a server connected to the Internet. In a map-information display system with such a configuration, the operator is capable of storing map information of a limited area into an onboard navigation system apparatus, even at a travel destination or elsewhere by connecting the apparatus 10 to the server through a communication line.

FIG. 6B is a schematic diagram showing a map-information display system implemented by a fourth embodiment of the present invention for use by a movable body. In the case of the map-information display system implemented by the fourth embodiment of the present invention for use by a movable body, map information of a limited area is generated in an apparatus other than the map-information display apparatus 10, or the onboard navigation system apparatus 10 as is the case with the third embodiment shown in FIG. 6A.

Map information used as a source for generating limited-area map information is stored in a server of the apparatus 20 such as a server connected to the Internet. Map information is displayed on a display unit of a computer of the apparatus 20 connected to the server by a communication line such as a LAN or a telephone line. Then, the operator creates map information of a limited area in the computer in accordance with the procedure explained earlier by referring to the flowchart shown in FIG. 2 by operating a keyboard and a mouse of the computer. Finally, the computer is connected to the map-information display apparatus 10, or the onboard navigation system apparatus 10 serving as the map-information display apparatus having a communication function through a predetermined communication means such as a LAN, a telephone line or a serial-communication connection line in order to store the limited-area map information generated in the computer into a storage unit such as a RAM provided in the map-information display apparatus 10, or the onboard navigation system apparatus 10. In a map-information display system with such a configuration, the operator is capable of traveling by taking along only the map-information display apparatus 10 used for displaying map information of a limited area generated in the computer. In addition, also in this case, the limited-area map information generated in the computer can also be stored in a server such as a server connected to the Internet as is the case with the configuration shown in FIG. 6C. It should be noted that elements of the configuration shown in FIG. 6C that are identical with configuration elements of the embodiment shown in FIG. 6B are denoted by the same reference numerals and the same names. In a map-infoimation display system with the configuration shown in FIG. 6C, the operator is capable of obtaining map information of a limited area generated in a computer by connecting the map-information display apparatus 10, or the onboard navigation system apparatus 10 serving as a the map-information display apparatus having a communication function to a server through a communication line such as a telephone line at a travel destination, or even in the course of travelling.

In addition, with map information of limited areas stored in a server in the third or fourth embodiments described above, it is not necessary to download map information of all the limited areas into the onboard navigation system apparatus. Instead, only map information of a desired area required at a particular time during travelling needs to be downloaded and displayed. In such a configuration, the memory capacity of a storage unit such as a RAM employed in the onboard navigation system apparatus can be further reduced.

In the embodiments described above, the map-information display apparatus for use by a movable body is exemplified by an onboard navigation system apparatus. It should be noted, however, that the scope of the present invention is not limited to an onboard navigation system apparatus. That is to say, the present invention can also be applied to a navigation system apparatus for use by a user travelling on foot.

In addition, in the embodiments described above, the retrieval width $\Delta w_i$ of an interposition section is fixed. It is worth noting that map information of areas each with a shape resembling a banner can also be generated by retrieving map information with the retrieval width $\Delta w_i$ varying from position to position along a route.

It should also be noted that the term 'banner-like-shaped area' used in this specification means a longitudinal area along a route, however, both the ends of such an area can have a variety of shapes other than a rectangle such as a semi circle or a semi ellipse.

As described above, according to a map-information display system provided by the present invention for use by a movable body, map information of areas each having a shape like a banner along a route traveled by a movable body is retrieved as map information of a limited area which is then displayed. Thus, it is possible to display propel map infoimation regardless of a route having been passed through by the movable body and/or a route to be traveled by the movable body.

The invention being thus described, it will be obvious that the same may be varied in many ways. Such variations are not to be regarded as a departure from the spirit and scope of the invention, and all such modifications as would be obvious to one skilled in the all are intended to be included within the scope of the following claims.

What is claimed is:

1. A map-information display system for a movable body, said system comprising:
   a coordinate-information generation means for generating coordinate information of positions on a passed through route and a to be traveled route by said movable body on a map;
   a limited-area map-information generation means for generating map information of a limited area by retrieving map information of only said limited area based on said coordinate information of positions on said passed through and to be traveled routes from map information which includes road information and is stored in a storage medium, said limited-area map-information generation means including:
      a route generation means for generating a route for said movable body based on said coordinate information of positions on said route and said road information; and
      a retrieval means for converting banner-shaped-area map information into said map information of said limited area; and
   a display means for storing and displaying said map information of said limited area.

2. The map-information display system for a movable body according to claim 1, wherein said retrieval means adds searched-area map information of searched areas each surrounding a position located on said route for said movable body and specified by an operator of the map-display system to said map information of said limited-area.

3. The map-information display system for a movable body according to claim 1, further comprising:
   a present-position coordinate-information detection means provided for detecting coordinates of the present position of said movable body; and
   said retrieval means adds information on said coordinates of the present position of said movable body to said map information of said limited-area.

4. The map-information display system for a movable body according to claim 3, wherein said present position coordinate-information detection means is a Global Positioning System (GPS).

5. The map-information display system for a movable body according to claim 1, wherein said banner-shaped-area map information is map information of an area having a shape resembling a banner stretched along said to be traveled route by said movable body.

6. A map-information display system for a movable body, said system comprising:
   a map-information supplying apparatus; and
   a map-information display apparatus, said map-information display apparatus including:
      a coordinate-information generation means for generating coordinate information of positions on a passed through route and a to be traveled route by said movable body on a map;
      a limited-area map-information generation means for generating map information of a limited area by retrieving map information of only said limited area based on said coordinate information of positions on said passed through and to be traveled routes from map information which includes road information and is stored in a storage medium, said limited-area map-information generation means including:
         a route generation means for generating a route for said movable body based on said coordinate information of positions on said route and said road information; and
         a retrieval means for converting banner-shaped-area map information into said map information of said limited area; and
      a display means for storing and displaying said map information of said limited area.

7. The map-information display system for a movable body according to claim 6, wherein said retrieval means adds searched-area map information of searched areas each surrounding a position located on said route for said movable body and specified by the operator to said map information of said limited-area.

8. The map-information display system for a movable body according to claim 6, further comprising:
   a present-position coordinate-information detection means provided for detecting coordinates of the present position of said movable body; and
   said retrieval means adds information on said coordinates of the present position of said movable body to said map information of said limited-area.

9. The map-information display system for a movable body according to claim 8, wherein said present position coordinate-information detection means is a Global Positioning System (GPS).

10. The map-information display system for a movable body according to claim 6, wherein said banner-shaped-area map information is map information of an area having a shape resembling a banner stretched along said to be traveled route by said movable body.

11. The map-information display system for a movable body according to claim 6, wherein said map-information supplying unit is a drive of a non-volatile storage medium, and map information stored in said map-information supplying unit is read out in response to a command issued by a CPU and supplied to an input/output bus by an interface circuit.

* * * * *